United States Patent

Krasij et al.

[11] Patent Number: 6,165,634
[45] Date of Patent: Dec. 26, 2000

[54] FUEL CELL WITH IMPROVED SEALING BETWEEN INDIVIDUAL MEMBRANE ASSEMBLIES AND PLATE ASSEMBLIES

[75] Inventors: Myron Krasij, Avon; Edward A. Moskey, Portland, both of Conn.

[73] Assignee: International Fuel Cells LLC, South Windsor, Conn.

[21] Appl. No.: 09/176,355

[22] Filed: Oct. 21, 1998

[51] Int. Cl.[7] .................................................. H01M 2/08
[52] U.S. Cl. ................................. 429/35; 429/36; 429/38
[58] Field of Search ................... 429/34–36, 38, 429/39

[56] References Cited

U.S. PATENT DOCUMENTS

| | | | |
|---|---|---|---|
| 4,374,185 | 2/1983 | Powers et al. | 429/36 |
| 4,769,297 | 9/1988 | Reiser et al. | 429/17 |
| 4,774,154 | 9/1988 | Singelyn et al. | 429/36 |
| 5,079,104 | 1/1992 | Roche et al. | 429/18 |
| 5,264,299 | 11/1993 | Krasji et al. | 429/30 |
| 5,270,132 | 12/1993 | Breault et al. | 429/35 |
| 5,328,542 | 7/1994 | Grasso et al. | 156/313 |
| 5,503,944 | 4/1996 | Meyer et al. | 429/13 |
| 5,523,175 | 6/1996 | Beal et al. | 429/30 |
| 5,700,595 | 12/1997 | Reiser | 429/13 |
| 5,837,395 | 11/1998 | Breault et al. | 429/35 |

*Primary Examiner*—Maria Nuzzolillo
*Assistant Examiner*—Tracy Dove
*Attorney, Agent, or Firm*—McCormick, Paulding & Huber LLP

[57] ABSTRACT

A fuel cell stack includes a plurality of fuel cells, each of which includes a membrane electrode assembly and a water transport plate, or a fluid flow plate fabricated from graphite. This plate and optionally a separator plate are held in assembled relationship with one another and with the membrane electrode assemblies by a fluoroelastomeric adhesive/sealant that is also coated on the external edges of these components to provide a water-tight seal to better contain the coolant fluid in the form of water provided in the fuel cell stack.

8 Claims, 2 Drawing Sheets

FUEL CELL WITH IMPROVED SEALING BETWEEN INDIVIDUAL MEMBRANE ASSEMBLIES AND PLATE ASSEMBLIES

FIELD OF THE INVENTION

This invention relates to electrochemical fuel cells, and deals more particularly with the sealing provided between a coolant flow-field plate and an adjacent component of the fuel cell, particularly with the membrane electrode assembly and/or an associated water separator plate.

BACKGROUND OF THE INVENTION

Prior U.S. Pat. Nos. 5,264,299 and 5,523,175 assigned to the assignee herein are representative of a prior art approach to sealing, with an elastomeric sealing material, peripheral portions of fuel cell components, particularly components which may be porous. More particularly, column 4 line 1 through column 6 line 49 of the '299 patent describes how a support plate might be assembled with a proton exchange membrane by such a sealing material peripherally joining these components. The '299 patent is hereby incorporated by reference herein.

Peripheral sealing of prior art membrane and plate assemblies generally requires impregnating the outside perimeter of each component with a chemical, such as SARTOMER GRADE 2108 from SARTOMER CO., INC., that requires curing in the absence of oxygen. Such chemicals are hydrophobic in the cured state so as to suffer from continuous contact with the cooling fluid currently favored, namely water as now used in fuel cells generally.

In prior art fuel cells the edges of water transport plates are impregnated with a resin, which when polymerized create an edge seal that prevents leakage of the gaseous reactants, and also serves to prevent infiltration of these reactants into the liquid coolant.

Typically resins that have been used to create such edge seals in water transport plates are SARTOMER 2100 made by SARTOMER CO., INC., and SYLGARD 170 made by the Dow Chemical Corporation. These polymers are somewhat hydrophobic, however, and are not totally wetted by water. Since water is a product of the reaction within the fuel cell, and typically also comprises the coolant in the proton exchange membrane fuel cell (PEM) such characteristics are undesirable for use in such edge seal applications. More particularly, as a consequence of this hydrophobicity is that the interface between the central active area of the water transport plate and the peripheral edge seal portion of the water transport plate may not totally fill with water. Such a situation reduces the sealing effectiveness of the water transport plate, and results in some leakage of reactant gases into the coolant which can result in a undesirable condition.

The edges of the porous catalyst support plates are impregnated to create edge seals also. One commonly used compound for such impregnation is a silicone rubber. However, the silicone rubber although resulting in an effective seal within the catalyst support plate does not exhibit good adhesion with the proton exchange membrane (PEM). This poor adhesion tends to permit reactant leakage at the interface between these components and allows the PEM to shrink away from the edge of the catalyst support plate, particularly if the water content of the proton exchange membrane is reduced due to the conditions of the PEM operating fuel cell. The shrinkage of the proton exchange membrane can result in an electrical short between the anode catalyst support plate and the cathode catalyst support plate. Such a short will of course reduce the efficiency of the fuel cell and may cause localized overheating.

Finally, the seal configuration in a typical PEM cell generally employs use of an acrylic tape to bond the periphery of the water transport plates to the periphery of the catalyst support plates in order to create an effective seal between these components. Such acrylic tape is also used to bond the two halves of the water transport plate to each other. Such seal configurations exhibit marginal performance due to hydrophobicity of the materials that are used and due to poor adhesion with the PEM. Further, such seals are expensive to manufacture as a result of the number of components and process steps required in their fabrication and assembly.

One object of the present invention is to provide a singe peripheral sealant coating that adheres to the porous graphite water transport plates and the porous graphite catalyst support plates, and which also adheres to the exchange membrane itself.

An advantage of the present invention can be attributed to the fact that this single adhesive/sealant that is used to coat the exterior edges and to impregnate the exterior edges of these components provides a convenient way of achieving desired functions of both sealing and of adhesion, and also obviates the disadvantages created by use of the materials described above for achieving the sealing and adhesion functions.

SUMMARY OF THE INVENTION

The details of the fuel cell construction and its method of operation are well known and described in commonly owned U.S. Pat. No. 5,264,299 and U.S. Pat. No. 5,523,175 as well as U.S. Pat. No. 5,503,944 and U.S. Pat. Nos. 5,700,595 plus 4,769,297 all of which patents are incorporated by reference herein.

These and other objects of the present invention can be achieved by providing a fuel cell stack wherein the individual cells in the stack include a membrane electrode assembly (MEA) wherein opposed catalyst layers are provided on opposite sides of the proton exchange membrane (PEM), and wherein opposed anode and cathode support plates, typically of porous graphite, are provided on opposite sides of this catalyst, and wherein said catalyst support plates contain a central area adjacent to the catalyst and peripheral areas to be sealed including a first seating surface. The combined reactant flow field plate/water transport plate is provided adjacent to the catalyst support plate and is also of porous graphite and includes a peripheral sealing area including a second seating surface.

A sealant coating preferably in the form of a fluoroelastomer is provided between these first and second seating surfaces, and serves to adhere and to bond the catalyst support plate to the flow-field plate.

The catalyst support plate provided adjacent to the catalyst layer and the membrane itself presents some problem in prior art fuel cell configurations, but the same sealant coating material can also be provided around the edges of the membrane electrode assembly and associated water transport plate or plates to provide a structure that prevents leakage of reactants and coolant.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

Figure 1:
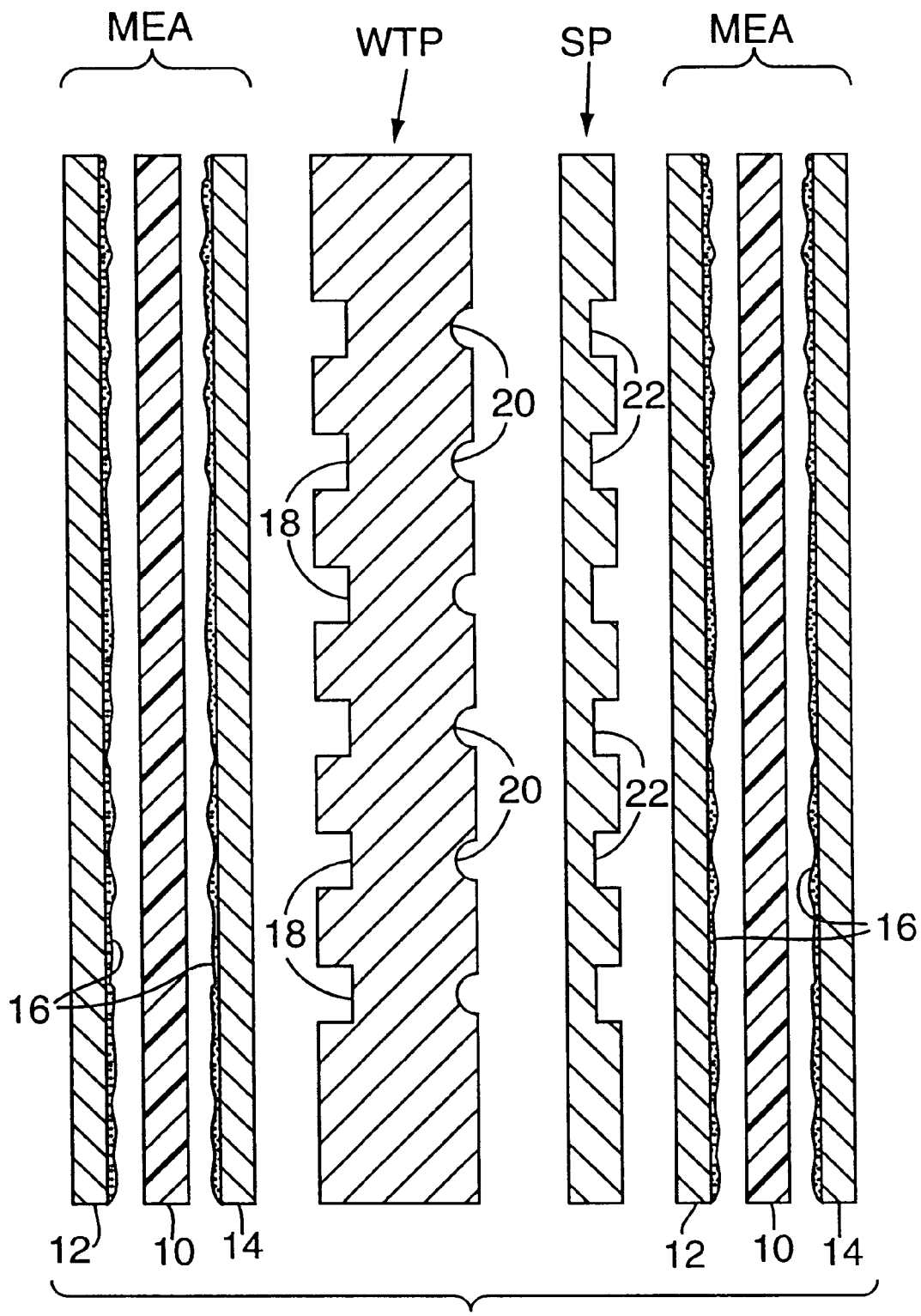
FIG. 1 is an exploded side elevational view illustrating several of the components in a pair of side-by-side fuel cells in a typical fuel cell stack of the type adapted to take advantage of the present invention.

Turning now to the drawings in greater detail, FIG. 1 shows, in exploded relationship, the various components of a typical fuel cell which are provided in repeating fashion in a typical fuel cell stack. Two membrane electrode assemblies are indicated at MEA in FIG. 1, and interposed therebetween is provided a water transport plate WTP and a separator plate SP.

Each membrane electrode assembly comprises a solid polymer ion exchange membrane 10 interposed between an anode 12 and a cathode 14. The anode and cathode will be referred to hereinafter as electrodes, and each contains a catalyst layer, such as indicated generally at 16 in FIG. 1 and a catalyst support plate. The catalyst layer is provided on the side of the electrode adjacent to the membrane 10, and renders these electrodes electrochemically active.

A flow-field plate, or water transport plate WTP contains channels 18 on the side facing the membrane electrode assembly MEA through which channels 18 an oxidant usually in the form of oxygen or air flows. This flow-field plate WTP contains other channels 20 on the side facing away from the membrane electrode assembly MEA through which channels 20 a coolant fluid in the form of water flows for purposes of withdrawing heat from the electrochemical reaction provided in the fuel cell.

A separator plate SP is provided adjacent to the water transport plate WTP for closing these channels and to define, on its opposite side adjacent the next membrane electrode assembly, suitable channels, such as shown at 22, for the flow of fuel, usually in the form of a gas containing hydrogen, adjacent the anode 12.

Variations of this structure are possible, and in some installations it may be possible or preferable to define the channels 20 for the coolant in a separator plate SP rather than in the same plate which defines the channels 18 associated with a reactant gas.

The prior art suggests that the seal between these various components, namely the membrane electrode assembly, the water transport plate, and the separator plate SP, comprise interfacial peripheral gaskets of silicone coated glass fabric preferably in the form of a silicone pressure sensitive adhesive applied to one side of each of these components. These silicone gaskets do provide acceptable sealing, but require relatively high sealing loads, and must, of necessity, be cut out of large sheets, creating a great deal of waste. Other approaches to this problem have taken the form of an edge seal formed by impregnating the outside perimeter of these components with a resin, such as SARTOMER™. Unfortunately this resin produces marginal results because such resins are typically hydrophobic in the cured state and therefore suffer from a reduction in the water bubble pressure at the edge seal interface. After impregnation with water, poor wetting of the chemical coated components generally occurs resulting in local leakage.

As mentioned previously, the preferred form of electrode support plate is generally in sheet form, or paper form, and is coated with the catalyst and requires sealing along its peripheral edges with a silicone rubber, such as SYLGARD 170™. Use of such a silicone sealant provides an acceptable seal, but does not afford sufficient adhesion with the membrane electrode assembly itself, which is typically fabricated from NAFION.

Figure 2:
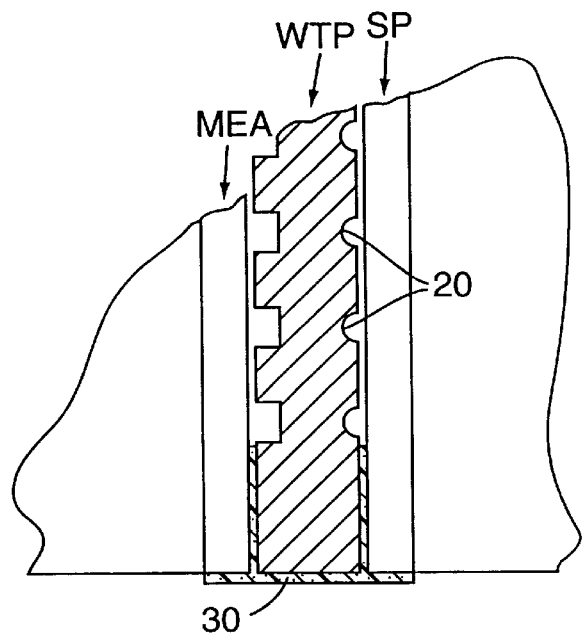
FIG. 2 is a view of a portion of the fuel cell of FIG. 1 showing the sealant coating provided between peripheral surfaces of the indicated components of the fuel cell, and also showing the same sealant coating provided at the outer edge of the fuel cell stack.

In accordance with the present invention, an improved adhesive/sealant 30 is provided both on the outer edges of the cell components and between the membrane electrode assembly and the water transport plate, as best shown in FIG. 2. The preferred material for such sealant is a fluoroelastomer, such as FLUOROLAST™ grade SB or WB amnufactured by Fluorolast, a division of Laureen. Not only does this brand of fluoroelastomer have excellent adhesion with NAFION™, as used in connection with construction with the membrane electrode assembly MEA, but the FLUOROLAST™, or a similar fluoroelastomer has also been found to adhere very well to graphite. The graphite material currently comprising the preferred conductive material for manufacturing fluid-flow plates, such as those illustrated at WTP and SP in FIG. 2. Graphite is suited for use with such an adhesive/coating so that these components will be secured to one another and afford an effective seal against the water in the channels 20.

Alternatively the separator plate may be eliminated and two water transfer plates (WTP) may be used in a back to back configuration. In this configuration the reactant flow channels are defined on the outward surfaces, and the water flow channels are defined on the inward surfaces. Each WTP is fabricated with a sufficient bubble pressure that it provides the function of separating the fuel from the oxidant.

Figure 3:
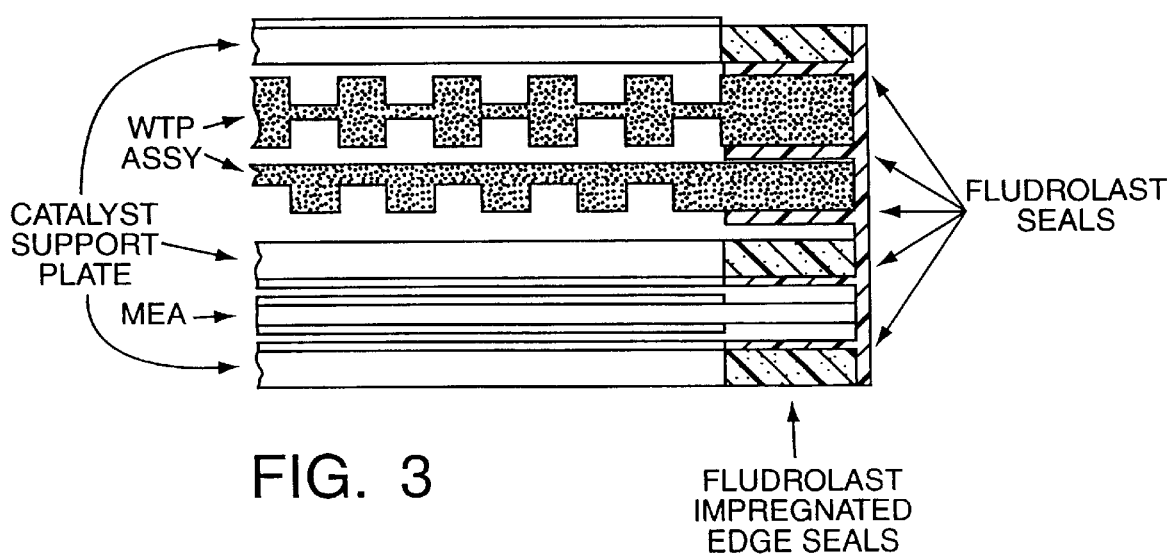
FIG. 3 is a view similar to FIG. 2 but showing the effect of the porous catalyst support plate and water transport plate assemblies for a cell with two water transport plates.

The preferred embodiment of the invention is shown in FIG. 3 where the periphery of the electrode support plate is impregnated with the Flourolast™, or a similar elastomer. FIG. 3 also shows the alternative cell configuration with back to back water transport plates (WTP) that eliminates the separator plate. The periphery of the electrode support plate is pervious, and impregnated with the Flourolast elastomer™, or a similar to create an edge seal and the sealing surface of each WTP is coated with Flourolast™, or a similar.

Laboratory results show that the variety of interfacial seals and edge seals formerly required, in the form of acrylic tape, SARTOMER 2100 and SYLGARD 170 can be replaced with the fluoroelastomer material 30 shown in FIG. 2 thereby reducing the overall cost of manufacture of a typical fuel cell stack and improving the sealing characteristics.

Subscale component tests have been performed to verify the various features of the invention. More particularly a 14 mil porous graphite electrode support plate, grade TGP-H-120 sold by Toray, was impregnated with Flourolast™, or a similar fluoroelastomer, and following impregnation the sample was cured for about 1 hour at about 212° F. The sample was then cut into a 3 inch by 3 inch frame, and so as to have a frame width of 0.25 inches. Two such samples were constrained in a pressure test fixture, and no overboard leakage of nitrogen was measured when the interior of the frame was pressurized to 95 psig (gage pressure in pounds per square inch).

A similar test was performed where the sealing surface of a, separator plate being of dense graphite material, and 0.9 mm thick, of the type sold by KOBE STEEL LTD. under its grade number GCR 101 G. These components were coated with Flourolast™, or a similar fluoroelastomer and cured for 72 hours at room temperature of approximately 70° F. Four such samples were cut to the above dimensions and assembled into a pressure test fixture. The bonded stack withstood 95 psig internal pressure of nitrogen with no inter facial leakage as evidence by the absence of a pressure decay for ten minutes. No gas bubbles were seen to form when the stack was immersed in water.

Tests were also performed to evaluated the effect of the flouroelastomer edge seal on the bubble pressure of the water transport plates. 3 inch by 3 inch by 0.1 inch thick porous graphite water transport plates made by International Fuel Cells were filled with water and their bubble pressures determined to be 8 psi. The samples were then dried, their edges sealed with the flourolast™, and 3 inch by 3 inch by 2.5 graphite frames bonded to both sides of the sample with Flourolast™. At the curing of 180° F. for 16 hours the samples were again filled with water and the bubble pressure measured to be 8 psi, indicating that edge sealing with the flouroelastomer did not degrade the bubble pressure of the water transport plates. This particular sample was then tested for outboard leaks as discussed above with no leakage measured at 95 psi.

While preferred embodiments have been shown and described, various modifications and substitutions may be made without departing from the spirit and scope of the invention. Accordingly, it is to be understood that the present invention has been described by way of example, and not by limitation.

Having thus described my invention, what is claimed is:

1. A fuel cell stack for generating electrical energy, wherein the cells in the stack are comprised of:
   a membrane electrode assembly including opposed catalyst layers, and a solid polymer proton exchange membrane between said catalyst layers, including opposed anode and cathode support plates adjacent to the catalyst layers, each catalyst support plate having a marginal peripheral face defining a first sealing surface;
   a reactant flow-field plate or water transport plate adjacent to one said catalyst support plate and having a peripheral face defining a second sealing surface; and
   a sealant coating between first and second sealing surfaces, said sealant coating being an elastomeric adhesive for bonding said catalyst support plate to said flow-field plate or water transport plate.

2. The fuel cell stack having cells according to claim 1, wherein said membrane electrode assembly includes a catalyst support layer between said catalyst layer and said membrane, said catalyst support layer provided in the form of a support sheet, and said sealant coating also provided externally around said membrane electrode assembly and also externally around said reactant flow-field plate.

3. The fuell cell stack according to claim 1, wherein said elastomeric adhesive comprises a fluoroelastomer.

4. The fuel cell stack having cells according to claim 1, further characterized by a separator plate provided adjacent said flow-field plate to define coolant flow passageways therebetween, and both said flow-field plate and said separator plate being sealed in the areas of their peripheries by said elastomeric adhesive.

5. The fuel cell stack having cells according to claim 1, wherein said fluid flow-field plate is fabricated from a graphite material.

6. The fuel cell stack having cells according to claim 1, wherein said catalyst support plates are fabricated from a graphite material.

7. The fuel cell stack according to having cells claim 1, wherein said sealant coating comprises a fluoroelastomer, and wherein said fluoroelastomer is provided externally of said membrane electrode assembly and flow-field plates or water transport plates in a fuel cell stack.

8. The fuel cell stack having cells according to claim 1 wherein said catalyst support plates have pervious peripheral portions impregnated with a flouroelastomer, and wherein said elastomeric adhesive comprises a flouroelastomer.

* * * * *

UNITED STATES PATENT AND TRADEMARK OFFICE
CERTIFICATE OF CORRECTION

PATENT NO. : 6,165,634
DATED : December 26, 2000
INVENTOR(S) : Myron Krasij and Edward A. Moskey It is certified that error appears in the above-identified patent and that said Letters Patent is hereby corrected as shown below:

Claim 7:
      Column 6, line 29, after "fuel cell stack", please delete "according to"; and after "having cells", insert --according to--.

Signed and Sealed this

First Day of May, 2001

*Attest:*

NICHOLAS P. GODICI

*Attesting Officer*     *Acting Director of the United States Patent and Trademark Office*